United States Patent
Mishraky (10) Patent No.: US 10,067,915 B1
(45) Date of Patent: Sep. 4, 2018

(54) METHOD AND SYSTEM FOR PROVIDING USER INTERFACE OBJECTS IN A MOBILE APPLICATION THAT ARE SCALABLE TO MOBILE ELECTRONIC DEVICE SCREENS

(71) Applicant: Intuit Inc., Mountain View, CA (US)

(72) Inventor: Elhanan Mishraky, Nofim (IL)

(73) Assignee: Intuit Inc., Mountain View, CA (US)

(*) Notice: Subject to any disclaimer, the term of this patent is extended or adjusted under 35 U.S.C. 154(b) by 573 days.

(21) Appl. No.: 14/519,440

(22) Filed: Oct. 21, 2014

(51) Int. Cl.
*G06F 17/00* (2006.01)
*G06F 17/21* (2006.01)
*G06F 17/24* (2006.01)
*G06F 8/38* (2018.01)

(52) U.S. Cl.
CPC ............ *G06F 17/212* (2013.01); *G06F 17/24* (2013.01); *G06F 8/38* (2013.01)

(58) Field of Classification Search
CPC ........................................................ G06F 8/38
See application file for complete search history.

(56) References Cited

U.S. PATENT DOCUMENTS

2012/0129503 A1* 5/2012 Lindeman ............. H04W 4/001
455/414.1
2013/0194289 A1* 8/2013 Snow ....................... G09G 5/14
345/581
2014/0164942 A1* 6/2014 LeMarquand ........ G06F 3/0484
715/744

OTHER PUBLICATIONS

Sher, A. "Automatically Scaling Android Apps for Multiple Screens" [online], Oct. 2, 2014, http://www.vanteon.com/downloads/Scaling_Android_Apps_White_Paper.pdf, ("Sher").*
Sher, A. 'Automatically Scaling Android Apps for Multiple Screens' [online], [retrieved on Oct. 2, 2014]. Retrieved from the Internet <URL: http://www.vanteon.com/downloads/Scaling_Android_Apps_White_Paper.pdf>.

* cited by examiner

*Primary Examiner* — Andrew T McIntosh
(74) *Attorney, Agent, or Firm* — Hawley Troxell Ennis & Hawley LLP; Philip McKay (57) ABSTRACT

A method and system includes generating a scalable application for mobile electronic devices, according to one embodiment. The method and system include determining a number of screen dimensions for the mobile electronic devices, according to one embodiment. The method and system include converting first display units into second display units for each of the number of screen dimensions, according to one embodiment. The method and system include generating the scalable application based at least partially on the second display units, according to one embodiment.

23 Claims, 4 Drawing Sheets

METHOD AND SYSTEM FOR PROVIDING USER INTERFACE OBJECTS IN A MOBILE APPLICATION THAT ARE SCALABLE TO MOBILE ELECTRONIC DEVICE SCREENS

BACKGROUND

Poorly sized text and/or objects in a webpage or mobile application can result in an unsatisfactory user experience. Many users of mobile electronic devices have read or manipulated webpages or mobile applications that have text and/or object sizes that appear to have been selected for another mobile electronic device. That is, the dimensions of the text or object appear to be poorly-suited, e.g., too large or too small, for the dimensions of the screen of the users' mobile electronic devices. The poorly sized text and/or objects can consume too much of the screen or can be illegibly or unenjoyably too small for a given screen size, resulting in an unsatisfactory user experience.

Developers constantly wrestle with the issue of properly sizing text and objects so that the text and objects are compatible, e.g., comfortably viewable, with mobile electronic devices having screen sizes of varying physical dimensions, varying resolutions, and varying pixel densities. Indeed, optimizing text and/or object sizes to be well-suited for all mobile electronic devices appears to be a moving target that generates frustration for both developers and users.

What is needed is a method and system for providing a user interface that is scalable to mobile electronic devices of different sizes.

SUMMARY

According to various embodiments, the present disclosure includes systems and methods that address some of the difficulties associated with poorly sized objects in mobile electronic device user interfaces by generating a user interface that is scalable to mobile electronic devices with screens of various sizes, to enable a proportional display of objects between the various mobile devices, according to one embodiment. The systems and methods convert a traditional display unit (e.g., pixels ("px"), density-independent pixels ("dp"), and scale-independent pixel ("sp") into a scalable display unit (e.g., scalable-density-independent pixels ("sdp")), according to one embodiment. An advantage of the scalable display unit is that the user interface object (e.g., an image object, a text object, or a user interface control object) will be automatically made larger for larger screen sizes and be made smaller for smaller screen sizes, to reduce and potentially eliminate user frustration associated with poorly sized user interface objects. The systems and method incorporate or import the scalable display unit into a scalable or mobile application ("mobile app") by: associating the scalable display units with a quantity of traditional display units, writing the scalable display units to a display unit conversion file, and incorporating or importing parts of the display unit conversion file into the mobile application prior to providing the mobile application to mobile electronic devices for execution, according to one embodiment.

By generating a user interface that is scalable to mobile electronic devices with screens of various sizes, implementation of embodiments of the present disclosure allows for significant improvement to the field of MOBILE ELECTRONIC DEVICE USER INTERFACES, USER INTERFACES, USER EXPERIENCE, INFORMATION TECHNOLOGY, and OPERATING SYSTEMS. As one illustrative example, by generating a user interface that is scalable to mobile electronic devices with screens of various sizes, implementation of embodiments of the present disclosure increases system efficiency by using fewer processing cycles and less communications bandwidth because developers are now able to create a single version of a mobile application that renders text and objects equally well on mobile electronic devices of various sizes. As a result, embodiments of the present disclosure allow for improved processor performance, more efficient use of memory access and data storage capabilities, reduced communication channel bandwidth utilization, and faster communications connections. Consequently, computing and communication systems implementing and/or providing the embodiments of the present disclosure are transformed into faster and more operationally efficient devices and systems.

In addition, by generating a user interface that is scalable to mobile electronic devices with screens of various sizes, implementation of embodiments of the present disclosure represent a significant improvement to the field of providing an efficient user experience and, in particular, efficient use of human and non-human resources. As one illustrative example, by generating a user interface that is scalable to mobile electronic devices with screens of various sizes, users can devote less time and energy to adjusting the zoom level of the screens of their mobile devices to better view or manipulate the displayed content. Consequently, using embodiments of the present disclosure, the user experience is less burdensome and the user can dedicate more of his or her time to other activities or projects.

BRIEF DESCRIPTION OF THE DRAWINGS

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

The INTRODUCTORY SYSTEM, HARDWARE ARCHITECTURE, PROCESS, and USER EXPERIENCE sections herein describe systems and processes suitable for providing a user interface that is scalable to mobile devices of various sizes, according to various embodiments.

Introductory System

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party. Examples of trusted computing environments include the assets and components making up data centers associated with, and/or controlled by, an application and/or any computing systems and/or virtual assets, and/or networks of computing systems and/or virtual assets, associated with, known by, and/or controlled by, an application.

In contrast, unknown, or untrusted computing environments are environments and systems where the assets, components, infrastructure, communication and networking systems, and security systems implemented and associated with the computing systems and/or virtual assets making up the untrusted computing environment, are not under the control of, and/or are not known by, a party, and/or are dynamically configured with new elements capable of being added that are unknown to the party. Examples of untrusted computing environments include, but are not limited to, public networks, such as the Internet, various cloud-based computing environments, and various other forms of distributed computing systems.

In various embodiments, each computing environment includes allocated assets and virtual assets associated with, and controlled or used to create, and/or deploy, and/or operate an application.

It is often the case that to create, and/or deploy, and/or operate, application data must be transferred between a first computing environment that is an untrusted computing environment and a trusted computing environment. However, in other situations a party may wish to transfer data between two trusted computing environments, and/or two untrusted computing environments.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as virtual assets.

Typically, virtual assets are created, or instantiated, using steps, instructions, processes, code, or "recipes" referred to herein as "virtual asset creation templates." Typically, virtual assets that have the same, or similar, operational parameters are created using the same or similar "virtual asset creation templates."

Examples of virtual asset creation templates include, but are not limited to, any tool and/or system for creating and managing a collection of related cloud resources. Illustrative examples of such a virtual asset creation template are any of the cloud formation templates/tools provided by Amazon Web Service (AWS), Rack Space, Joyent, and/or any other of the numerous cloud based infrastructure providers.

Other examples of virtual asset creation templates include, but are not limited to, any configuration management tool associated with, and/or used to create, virtual assets. One specific illustrative example of such a virtual asset creation template is a cookbook or recipe tool such as a Chef Recipe or system or any other fundamental element, or set of elements, used to override the default settings on a node within an infrastructure or architecture.

Other examples of virtual asset creation templates include, but are not limited to, any virtual appliance used to instantiate virtual assets. One specific illustrative example of such a virtual asset creation template is an Amazon Machine Image (AMI), and/or similar functionality provided by Amazon Web Service (AWS), Rack Space, Joyent, and/or any other of the numerous cloud based infrastructure providers.

Other examples of virtual asset creation templates include, but are not limited to, any appliance, or tool, or system, or framework, used to instantiate virtual assets as discussed herein, and/or as known/available in the art at the time of filing, and/or as developed/made available after the time of filing.

Herein virtual assets that have the same, or similar, operational parameters and are created by the same or similar virtual asset creation template are generically referred to as virtual assets of the same "class." Examples of virtual asset classes include, but are not limited to, virtual machine classes; virtual server classes; virtual database or data store classes; self-monitoring virtual assets including specific types of instances instantiated in a cloud environment; application development process classes; and application classes.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system. The term "developer" includes one or more users that generate and/or modify computer-readable instructions to cause a computing system or device to perform a particular function, according to one embodiment.

Hardware Architecture

Figure 1:
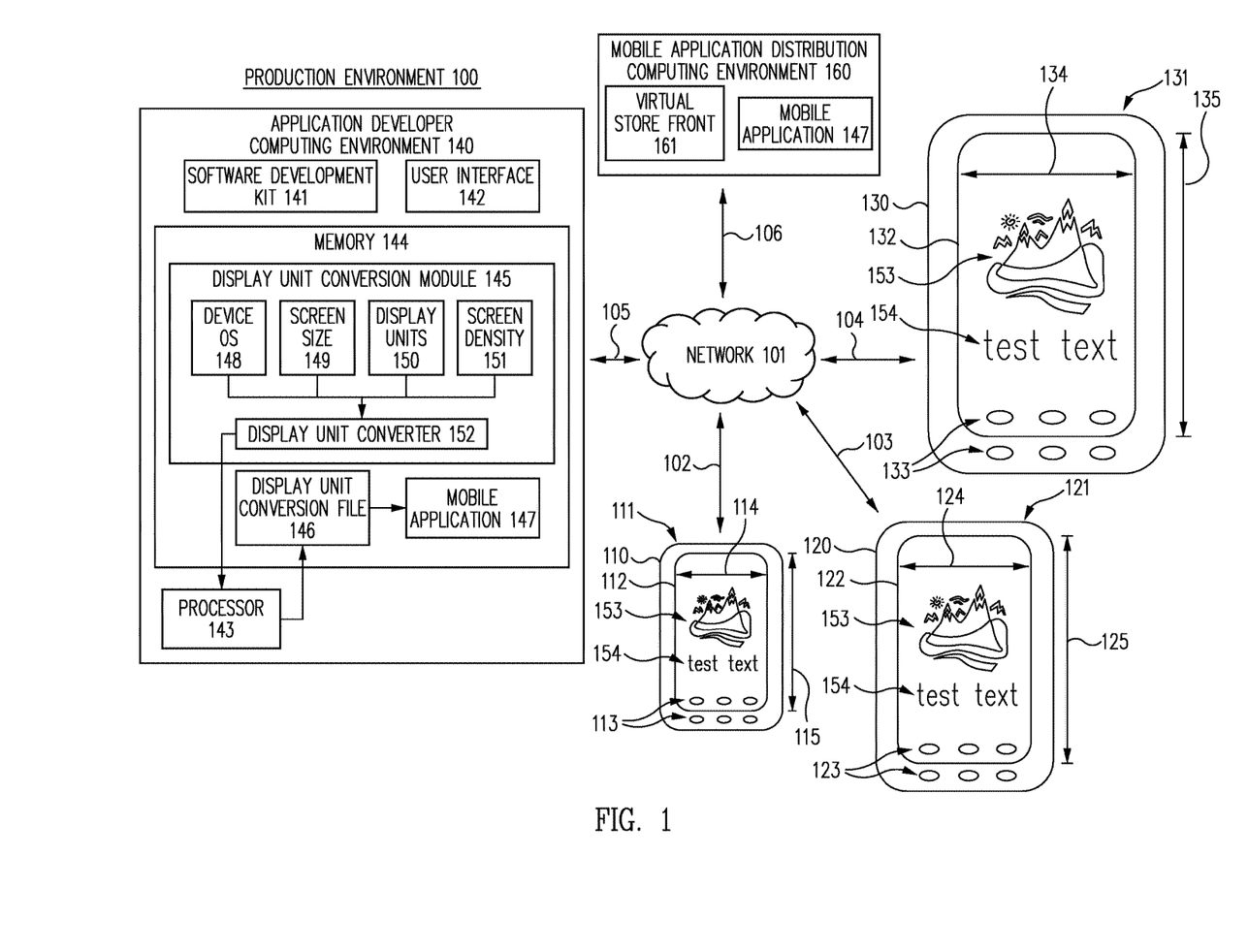
FIG. 1 is a block diagram of software architecture for providing a user interface that is scalable to mobile electronic devices of various sizes, in accordance with one embodiment.

FIG. 1 illustrates a block diagram of a production environment 100 for providing a user interface that is scalable to a mobile electronic device, based at least partially on the size of the screen of the mobile electronic device, according to one embodiment. The production environment 100 generates a mobile application with the scalable user interface that adapts one or more objects, e.g., text and images, to a screen at least partially based on one or more dimensions of the screen, according to one embodiment. The mobile application incorporates or references a display unit conversion file that converts a first set of display units into a scalable set of display units, according to one embodiment. The scalable set of display units are at least partially based on one or more dimensions of the screen of the mobile electronic device that is executing the mobile application, according to one embodiment. The production environment 100 generates the display unit conversion file by describing scalable display units in terms of pixels, virtual pixels, or another available display unit, according to one embodiment. The scalable display units are based at least partially on a minimum reasonable screen width, a screen width of an electronic mobile device that is executing the mobile application, and a pixel density of the electronic mobile device that is executing the mobile application, according to one embodiment. The use, incorporation, or reference of the display unit conversion file by the mobile application enables the mobile application to provide scalable objects that are proportional to the width or other dimension of a target mobile electronic device, according to one embodiment.

Developers constantly wrestle with the issue of properly sizing text and objects so that the text and objects are compatible, e.g., comfortably viewable, with mobile electronic devices which have screen sizes of varying physical dimensions, varying resolutions, and varying pixel densities. Indeed, optimizing text and/or object sizes to be well-suited for all mobile electronic devices appears to be a moving target that generates frustration for both developers and users.

The production environment 100 addresses some of the difficulties associated with poorly sized objects in mobile electronic device user interfaces by generating a user interface that is scalable to mobile electronic devices with screens of various sizes, to enable a proportional display of objects between the various mobile devices, according to one embodiment. By generating a user interface that is scalable to mobile electronic devices with screens of various sizes, implementation of embodiments of the present disclosure allows for significant improvement to the field of MOBILE ELECTRONIC DEVICE USER INTERFACES, USER INTERFACES, USER EXPERIENCE, INFORMATION TECHNOLOGY, and OPERATING SYSTEMS. As one illustrative example, by generating a user interface that is scalable to mobile electronic devices with screens of various sizes, implementation of embodiments of the present disclosure increases system efficiency by using fewer processing cycles and less communications bandwidth because developers are now able to create a single version of a mobile application that renders text and objects equally well on mobile electronic devices of various sizes. As a result, embodiments of the present disclosure allow for improved processor performance, more efficient use of memory access and data storage capabilities, reduced communication channel bandwidth utilization, and faster communications connections. Consequently, computing and communication systems implementing and/or providing the embodiments of the present disclosure are transformed into faster and more operationally efficient devices and systems.

In addition, by generating a user interface that is scalable to mobile electronic devices with screens of various sizes, implementation of embodiments of the present disclosure represent a significant improvement to the field of providing an efficient user experience and, in particular, efficient use of human and non-human resources. As one illustrative example, by generating a user interface that is scalable to mobile electronic devices with screens of various sizes, users can devote less time and energy to adjusting the zoom level of the screens of their mobile devices to better view or manipulate the displayed content. Consequently, using embodiments of the present disclosure, the user experience is less burdensome and the user can dedicate more of his or her time to other activities or projects.

The production environment 100 includes a first mobile electronic device 110, a second mobile electronic device 120, a third mobile electronic device 130, an application developer computing environment 140, and a mobile application distribution computing environment 160, for generating, distributing, and viewing a user interface that is scalable to mobile electronic devices with screens of various sizes, according to one embodiment. The mobile electronic devices 110, 120, 130, the application developer computing environment 140, and the mobile application distribution computing environment 160, are communicatively coupled to each other through a network 101 with communication channels 102, 103, 104, 105, and 106 respectively, according to one embodiment. The application developer computing environment 140 is associated with at least one developer and is interchangeably referred to as "the developer," according to some embodiments.

The first mobile electronic device 110 is configured to receive and execute a mobile application, according to one embodiment. The first mobile electronic device 110 includes a housing 111, a screen 112, and buttons 113, according to one embodiment. The housing 111 is configured to carry and protect the various electronics such as processors, memory, batteries, printed circuit boards, the screen 112, the buttons 113, and the like, according to one embodiment. The screen 112 can be an output device, or an input/output device, according to various embodiments. For example, the screen 112 is an acoustic, capacitive, or pressure-responsive touchscreen that is used by the first mobile electronic device 110 to both display information and to receive input from a user, according to one embodiment. The screen 112 can have various characteristics such as a width 114, a length 115, a resolution (e.g., a number of pixels), and a density (e.g., pixels per area or dots per inch ("dpi")), according to one embodiment. The application developer computing environment 140 is responsive to one or more of the characteristics of the screen 112 or other features of the mobile electronic device 110 while generating a user interface that is scalable for the screens of the mobile electronic devices 110, 120, 130, according to one embodiment. The buttons 113 are virtual buttons operated through the screen 112, our physical buttons carried by the housing 111, or are a mix of virtual buttons and physical buttons for receiving input from a user, according to one embodiment.

The second mobile electronic device 120 and the third mobile electronic device 130 include different but similar features as the first mobile electronic device 110, according to one embodiment. The second mobile electronic device 120 includes a housing 121, a screen 122, and buttons 123, according to one embodiment. The screen 122 includes a width 124 and a length 125, according to one embodiment. The third mobile electronic device 130 includes a housing 131, a screen 132, and buttons 133, according to one embodiment. The screen 132 includes a width 134 and a length 135, according to one embodiment. Each of the screens 122 and 132 includes a resolution (e.g., a number of pixels), and the density (e.g., pixels per area or dpi), according to one embodiment. In one embodiment, the width 114, 124, and 134 are each different from one another and the lengths 115, 125, 135 are different from one another. In one embodiment, the first mobile electronic device 110 includes physical dimensions that are smaller than the second mobile electronic device 120, and the second mobile electronic device 120 includes physical dimensions that are smaller than the third mobile electronic device 130. According to various embodiments, each of the screens 112, 122, 132 have pixel resolutions and/or pixel densities that are different from one another. In one embodiment, two or more of the screens 112, 122, 132 have a pixel resolution and/or a pixel density that is the same.

The application developer computing environment 140 enables a developer or other user to write, compile, test, and generate mobile applications having scalable user interfaces for deployment on to the mobile electronic devices 110, 120, 130, according to one embodiment. The application developer computing environment 140 includes, but it not limited to, a laptop, a desktop computer, a remotely-accessible cloud computing environment, and a virtual machine (e.g., a tenant) within a shared cloud computing environment, according to one embodiment. The application developer computing environment 140 includes a software development kit 141, a user interface 142, a processor 143, and memory 144, for enabling a developer to generate mobile applications having scalable user interfaces and/or scalable objects within the user interfaces, according to one embodiment.

The software development kit 141 enables the developer to simulate, e.g., duplicate the behavior of, a mobile electronic device or emulate, e.g., duplicate the inner workings of, a mobile electronic device, according to one embodiment. The software development kit 141 enables the user to organize, compile, test, and debug one or more source code files in a project, for generating an executable mobile application, while displaying or otherwise outputting results that are produced by the execution of the mobile application on one or more mobile electronic devices, according to one embodiment. The software development kit 141 can include, but is not limited to, an Android software development kit ("SDK") such as Eclipse ADT, a Windows Mobile SDK, Native Client SDK, and iOS SDK, according to one embodiment. In one embodiment, the software development kit is an Android operating system SDK. In one embodiment, the software development kit 141 includes the user interface 142 for receiving inputs from the developer and for displaying information to the developer. The application developer computing environment 140 uses the user interface 142 to display emulations of the mobile electronic devices 110, 120, 130 executing a mobile application, according to one embodiment. In another embodiment, the application developer computing environment 140 provides the user interface 142 to enable the developer to interact with a virtual machine that is hosted by the application developer computing environment 140, according to one embodiment.

The application developer computing environment 140 uses the processor 143 to execute instructions stored in the memory 144 to generate a scalable user interface or to generate scalable objects within a user interface for a mobile application, according to one embodiment. The processor 143 includes one, two, or more computer processors or computer processor cores for executing instructions stored in the memory 144, according to one embodiment. The memory 144 includes volatile memory, non-volatile memory, and/or a combination of volatile and non-volatile memory, according to various embodiments.

The memory 144 includes instructions for a display unit conversion module 145 that is configured to generate a display unit conversion file 146 for incorporation into or reference by a mobile application 147, according to one embodiment. The display unit conversion module 145 generates the display unit conversion file 146 based on various features of mobile electronic devices that may be used to execute the mobile application 147, according to one embodiment. The display unit conversion module 145 generates the display unit conversion file 146 based on an operating system 148, a screen size 149, display units 150, and/or screen density 151 of mobile electronic devices that may be used to execute the mobile application 147, according to one embodiment. The operating system 148 can include, but is not limited to an Android operating system ("OS"), a Windows Mobile OS, iOS, Linux, or the like, according to various embodiments. The screen size 149 can include, but is not limited to, a physical width of a screen, a physical length of a screen, a physical diagonal measurement of a screen, and/or a width, length, or diagonal of a screen in display units, e.g., pixels, according to one embodiment. The screen size 149 can also be generalized into relative sizes, such as small, normal, large, and extra-large, according to one embodiment. The display units 150 can include, but are not limited to, pixels ("px"), density-independent pixels ("dp"), scale-independent pixels ("sp"), or the like, according to one embodiment. Pixels represent a physical number of pixels within a screen, or within a visible portion of the screen. The total number of pixels within a screen, or within a visible portion of a screen, are the resolution of the screen. Density-independent pixels are an abstract unit that is based on the physical density of a screen, these units are relative to a 160 dots per inch ("dpi") screen, on which 1 dp is roughly equal to 1 px. Scale-independent pixels are similar to density-independent pixels, but are scaled to a user's font size preference that may be adjusted for both screen density and user preference. Screen density 151 includes a quantity of pixels within a physical area of the screen, is usually referred to as dpi, and can be generalized into relative densities such as: low, medium, high, extra-high, extra-extra-high, and extra-extra-extra-high, according to one embodiment.

The display unit conversion module 145 includes a display unit converter 152 that is configured to generate scalable display units, e.g., scalable-density-independent pixels ("sdp"), according to one embodiment. The scalable display units enable a developer to define an object size that is scaled for a mobile electronic device based at least partially on a dimension of the screen size of the mobile electronic device, according to one embodiment. The display unit converter 152 receives the screen size 149 and display units 150 and generates a plurality of scalable display units based at least partially on the received screen size 149 and the received display units 150, according to one embodiment.

The display unit converter 152 includes one or more algorithms which, when executed by the processor 143, generates the display unit conversion file 146, which includes a conversion between the scalable display units and the received display units 150 (e.g., density-independent pixels), according to one embodiment. An embodiment of an algorithm for the display unit converter 152 includes the following:

(1) define array of screen dimensions for mobile electronic devices
(2) loop through each screen dimension in the array
   (3) create a display unit conversion file for the current screen dimension of the array
   (4) loop through an index of the scalable display units to be converted from other display units (e.g., density-independent pixels)
      (5) create a ratio between the current screen dimension and the minimum screen dimension
      (6) associate a quantity of other display units with the indexed scalable display unit, the quantity of other display units being equal to the product of the ratio and the indexed scalable display unit
      (7) write the indexed scalable display unit with its associated quantity of other display units to the display unit conversion file for the current screen dimension
   (8) end loop through each display unit to be converted
(9) end loop through each screen dimension.

The algorithm for display unit converter 152 defines screen dimensions in terms of density-independent pixels, such as 300, 360, 420, 480, 540, 600, 660, and 720, according to one embodiment. The algorithm can include two, four, six, eight, or any number of screen dimensions, according to one embodiment. The algorithm defines screen dimensions in terms of physical pixels, according to another embodiment.

The algorithm for display unit converter 152 creates a display unit conversion file 146 for each screen dimension, according to one embodiment. Each display unit conversion file 146 can be named at least partially based on one or more screen dimensions, according to one embodiment. In an alternative embodiment, the algorithm is configured to create a single display unit conversion file 146 that includes scalable display units for all of the screen dimensions. The display unit conversion file 146 is an extensible markup language ("XML") file and includes the name "dimens.xml" for convenient incorporation by or reference by other XML files or by java code, according to one embodiment. The scalable display unit files are created and/or stored in a resources directory, e.g., "/res" directory, in a Java project directory or in an Android SDK project directory for incorporation by or reference by the project, according to one embodiment.

The algorithm creates a ratio between the current screen dimension of the loop and the minimum screen dimension of the screen dimension array, according to one embodiment. The ratio is used to define the scalable display units with respect to the size of the screen of the mobile electronic device that is executing the mobile application, and with respect to the minimum mobile electronic device screen defined in the display unit converter 152, according to one embodiment.

The algorithm associates a quantity of display units with the indexed scalable display unit, according to one embodiment. The quantity of display units is an sdp value and is a product of 1) the ratio between current screen dimension and the minimum screen dimension, and 2) an indexed scalable display unit, according to one embodiment. The index of the scalable display units can, for example, range from 1 to 600 sdp, according to one embodiment. Each element in the index of the scalable display units represents a number of scalable display units (e.g., scalable-density-independent pixels (sdp), according to one embodiment. An example of the product of the index of the scalable display unit and the ratio includes:

$$\text{sdp value} = \text{index}_{sdp} * (\text{current screen dimension/minimum screen dimension}).$$

Example values of the sdp value (e.g., a scalable display unit) are included below in Table 1 for various example screen sizes. As shown, the value of 1

TABLE 1

| sdp value (in dp) | sdp index | current screen dimen. | min. screen dimen. |
|---|---|---|---|
| 1 dp | 1 sdp | 300 | 300 |
| 2 dp | 2 sdp | 300 | 300 |
| 2 dp | 1 sdp | 600 | 300 |
| 4 dp | 2 sdp | 600 | 300 |
| 2.4 dp | 1 sdp | 720 | 300 |
| 4.8 dp | 2 sdp | 720 | 300 | sdp may vary, based on the ratio between the current screen dimension and the minimum screen dimension. The mobile application 147 is configured to determine which screen dimension or settings to apply based on the mobile electronic device that is executing the mobile application 147, according to one embodiment. The mobile application 147 is configured to include scalable display units and scalable display unit values (e.g., conversion values) for each of the screen dimensions defined in the display unit converter 152, to support mobile electronic devices of varying screen dimensions, according to one embodiment.

The algorithm writes the indexed scalable display unit to the scalable display unit file with its associated quantity of other display units, e.g., density-independent pixels (dp), according to one embodiment. The algorithm continues to loop through indices of the scalable display units, e.g., 600 indices, and writes the indexed scalable display unit with associated quantity of other display units to the display unit conversion file until the loop has completed, according to one embodiment. The display unit converter 152 can be configured to index various quantities, e.g., resolutions, of scalable display units, e.g., 10, 50, 100, 300, 600, etc., and is configured to write the quantity of scalable display units to the display unit conversion file with the corresponding conversion values, according to one embodiment.

The algorithm of the display unit converter 152 then ends the control loops, e.g., "for loops", according to one embodiment.

In an alternative implementation, the indexed scalable display units are converted from pixels, rather than density-independent pixels (dp), according to one embodiment. Density-independent pixels are proportional to a pixel index and 160, and are inversely proportional to a pixel density for the screen of a mobile electronic device, according to one embodiment. In other words, $$dp = px * (160/dpi), \text{ and}$$

$$dp = \text{sdp value} = (\text{index}_{sdp}) * (\text{current screen dimension/minimum screen dimension}), \text{therefore}$$

$$px = \text{index}_{sdp} * (dpi/160) * (\text{current screen dimension/minimum screen dimension}).$$

In an alternative implementation, the algorithm creates a ratio between the scalable display unit index and the minimum screen dimension, before determining a scalable display unit value as the product of the ratio and the current screen dimension (in dp), according to one embodiment.

The use of density-independent pixels is automatically supported through the use of Android SDK's such as Eclipse ADT, and some Android forums recommend the use of density-independent pixels to provide consistent text sizes over various mobile electronic devices. However, as shown below in FIG. 3, the use of density-independent pixels for sizing objects on varying sizes of mobile electronic devices can produce an unsatisfactory user experience.

In one non-limiting example, the algorithm in the display unit converter 152 for creating the display unit conversion file 146 can include code written in Java to perform the conversion of display units, such as density-independent pixels, into scalable display units, according to one embodiment. The Java code of one non-limiting example may include the following:

```
public void createDimens( ) {
    double[ ] dimens=new double[ ]{300,360,420,480,540,
       600,660,720};
    for(double dimen: dimens){
       String folder="values-sw"+(int)dimen+"dp";
       String fileName=folder+"/dimens.xml";
       new File(folder).mkdir( );
       new File(fileName).createNewFile( );
       PrintWriter printWriter=new PrintWriter(fileName);
       printWriter.println("<?xml
          version=\"1.0\"encoding=\"utf-8\"?>");
```

```
printWriter.println("<resources>");
for(int i=1;i<=600;i++){
    double min=300d;
    double ratio=dimen/min;
    double sdp=i*ratio;
    printWriter.printf("\t<dimen        name=\"_%
        dsdp\">%.2fdp</dimen>\r\n",i,sdp);
}
    printWriter.println("</resources>");
    printWriter.close( );
}
}
```

The example Java code for creating the display unit conversion file 146 performs similar functions as the generic algorithm disclosed above, according to one embodiment. The Java code for creating the display unit conversion file 146 defines an array of screen dimensions, creates folders, directories, and files based on the screen dimensions. The example Java code associates a quantity of density-independent pixels with a scalable display unit index (i), and writes the scalable display unit index (i) with the quantity of density-independent pixels to a file, according to one embodiment.

The display unit converter 152 advantageously enables a developer to size objects, such as images, control objects, and text, using scalable display units so that the objects within a mobile application are automatically resized based at least partially on the screen dimensions, the screen density, the screen size, and/or the screen resolution, according to various embodiments.

The display unit conversion file 146 includes scalable display units that can be referenced by, imported by, or otherwise incorporated by the mobile application 147, according to one embodiment. For example, the display unit conversion file 146 includes conversions between scalable display units (sdp) and density-independent pixels in an XML format for incorporation by the mobile application 147, according to one embodiment. In one non-limiting example, lines of the XML format for the conversion between the scalable display units (sdp) and the density-independent pixels (dp) may include the following for a 720 dp wide screen and for a minimum screen width of 300 dp:
   <dimen name="_1sdp">2.4dp</dimen>
   <dimen name="_2sdp">4.8dp</dimen>
   <dimen name="_3sdp">7.2dp</dimen>
   <dimen name="_4sdp">9.6dp</dimen>
   <dimen name="_5sdp">12.0dp</dimen>.
In other words, 1 sdp=2.4 dp; 2 sdp=4.8 dp; 3 sdp=7.2 dp; 4 sdp=9.6 dp; and 5 sdp=12.0 dp, according to one embodiment.

The mobile application 147 can be configured to display various types of information to a user and can be configured to receive various types of information from a user. According to one embodiment, the mobile application 147 is configured to display and receive user information related to financial transactions, such as personal finances, business finances, money transfers, bank accounts, and debts/credits with financial institutions, according to various embodiments. The application developer computing environment 140 enables the mobile application 147 to import, reference, or otherwise incorporate at least part of the display unit conversion file 146 so that the mobile application 147 can provide scalable objects to the mobile electronic devices 110, 120, 130, according to one embodiment.

The mobile application 147 is configured to display a picture object and/or a text object according to one embodiment. Within the mobile application 147, e.g., before the mobile application 147 runs on mobile electronic devices 110, 120, 130, a picture object 153 is assigned a size in scalable display units, e.g., 200 sdp width and 190 sdp height, and a text object 154 ("test text") is assigned a size in scalable display units, e.g., 50 sdp, according to one embodiment. As illustrated, the picture object 153 and the text object 154 scale to sizes that are in proportion with at least one dimension of the mobile electronic devices 110, 120, and 130, as the mobile application 147 is executed by each of the mobile electronic devices 110, 120, and 130, according to one embodiment. The mobile application 147 scales the picture object 153 and the text object 154 to the widths 114, 124, and 134 of the mobile electronic devices 110, 120, and 130, respectively, according to one embodiment. In another embodiment, mobile application 147 scales the picture object 153 and the text object 154 to the lengths 115, 125, and 135 of the mobile electronic devices 110, 120, and 130, respectively.

The application developer computing environment 140 uses the network 101 to distribute the mobile application 147 to the mobile electronic devices 110, 120, 130, according to one embodiment. The application developer computing environment 140 may be configured to transfer the mobile application 147 to the mobile application distribution computing environment 160, through the network 101, to enable the mobile application distribution computing environment 160 to distribute the mobile application 147 to the mobile electronic devices 110, 120, 130, according to one embodiment. The mobile application distribution computing environment 160 includes a virtual storefront 161, according to one embodiment. The virtual storefront 161 enables users to search for, select, download, and/or purchase the mobile application 147 from one or more electronic mobile devices, e.g., the electronic mobile devices 110, 120, 130, according to one embodiment.

The display unit converter 152 generates the display unit conversion file 146 for use by the mobile application 147 and provides advantages over traditional techniques for generating scalable objects. For example, execution of the display unit converter 152 enables scaling of objects, such as pictures, text, and control features, according to one embodiment. The execution of the display unit converter 152 also enables a developer to be able to preview emulations of the mobile application 147 within the software development kit 141. The execution of the display unit converter 152 generates the scalable display units when the mobile application 147 is written, rather than generating scalable display units during run-time, e.g., execution of the mobile application 147 on a mobile electronic device. Accordingly, the execution of the display unit converter 152 saves processing cycles on the mobile electronic devices, when compared to traditional techniques for scaling text or objects between different mobile devices.

Process

Figure 2:
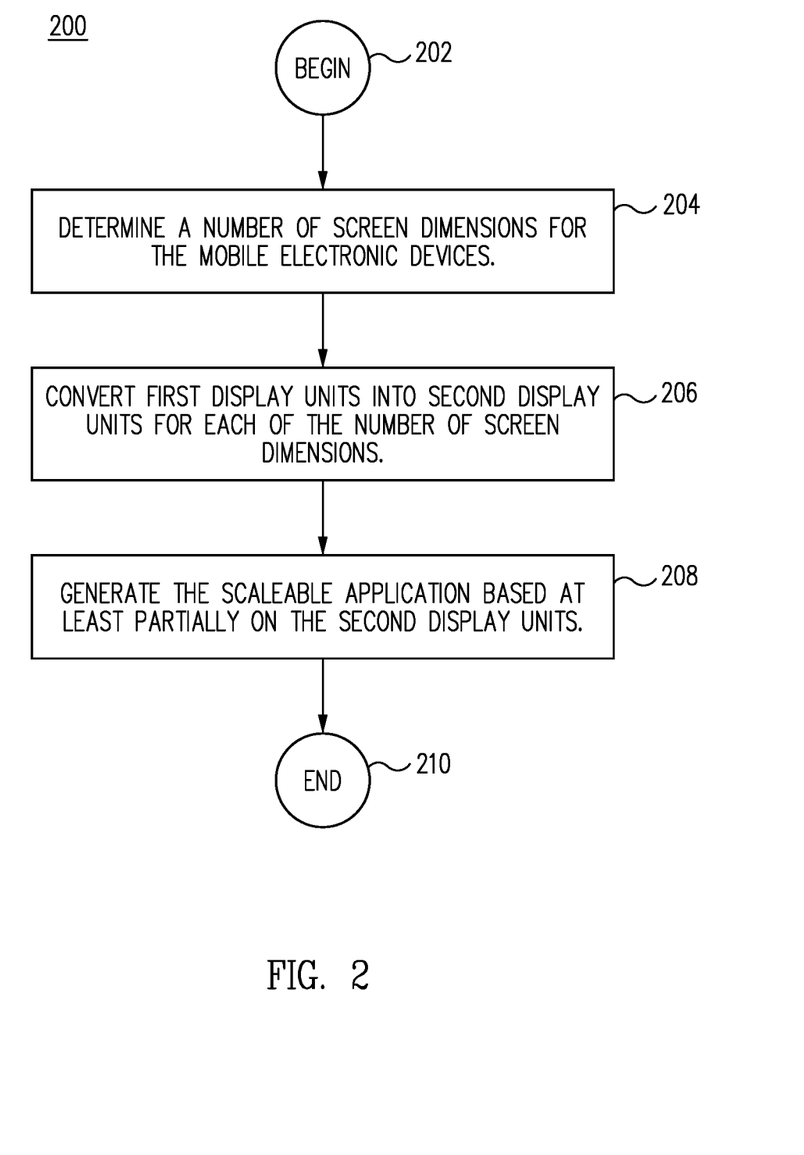
FIG. 2 is a block diagram of a process for generating a scalable application for mobile electronic devices, in accordance with one embodiment.

FIG. 2 illustrates a functional flow diagram of a process 200 for generating a scalable application for mobile electronic devices in the production environment 100, according to one embodiment. Although a particular sequence of events is described hereafter, other sequences may be applied, according to various embodiments.

At block 202, the process begins.

At block 204, the process determines a number of screen dimensions for the mobile electronic devices, according to one embodiment. The number of screen dimensions are chosen by a developer of the scalable application, according to one embodiment. As used herein, a scalable application and a mobile application ("mobile app") are interchangeable terms, according to one embodiment.

At block 206, the process converts first display units into second display units for each of the number of screen dimensions, according to one embodiment. Converting the first display units into the second display units for each of the number of screen dimensions can include: determining a ratio between a selected one of the number of screen dimensions and a smallest one of the number of screen dimensions; iterating through an index of quantities of the second display units; associating a quantity of first display units with an indexed quantity of the second display units; and writing the index of quantities of the second display units with the quantity of first display units to display unit conversion files, according to one embodiment.

At block 208, the process generates the scalable application based at least partially on the second display units, according to one embodiment. Generating the scalable application can include incorporating the display unit conversion files into the scalable application, e.g., during the writing and compiling of the scalable application, according to one embodiment.

At block 210, the process ends.

Although a particular sequence is described herein for the execution of the process 200, other sequences can also be implemented, according to other embodiments. Although particular components, e.g. the display unit conversion module 145, have been identified as performing a particular task or as transmitting particular content, according to other embodiments, other components, e.g., the application developer computing environment 140, are configured to perform the particular task, according to other embodiments.

User Experience

Figure 3:
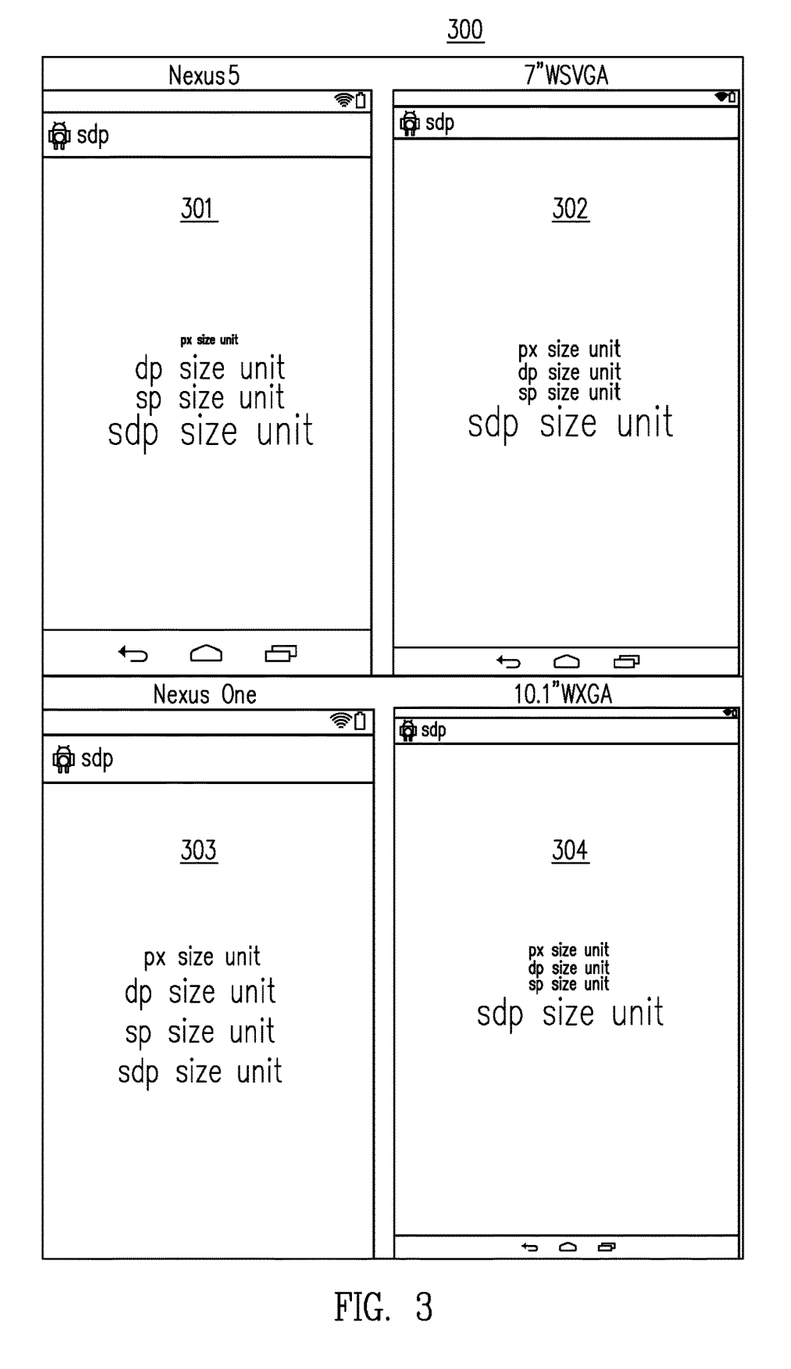
FIG. 3 is a diagram of illustrative emulations of different display units on different mobile electronic devices, in accordance with one embodiment.

FIG. 3 illustrates examples of comparative emulations 300 of text objects with different display units, as displayed by the screens of various mobile electronic devices, according to one embodiment. The comparative emulations 300 include a screen shot 301 of a Nexus 5 (i.e., 1080×1920 pixels) screen emulation, a screen shot 302 of a 7" WSVGA (e.g., 1024×576 pixels) screen emulation, a screen shot 303 of a Nexus One (i.e., 480×800 pixels) screen emulation, and a screen shot 304 of a 10.1" WXGA (e.g., 1280×800 pixels) tablet screen emulation, according to one embodiment. The screen shots 301-304 illustrate a comparative scaling when defining the size of a text object in terms of px (pixels) display units, dp (density-independent pixels) display units, sp (scale-independent pixels) display units, and sdp (scalable-density-independent pixels) display units, according to one embodiment. Each of the screen shots 301-304 display "px size unit" on the various device emulations for a text size of 30 px. Each of the screen shots 301-304 display "dp size unit" on the various device emulations for a text size of 30 dp. Each of the screen shots 301-304 display "sp size unit" on the various device emulations for a text size of 30 sp. Each of the screen shots 301-304 display "sdp size unit" on the various device emulations for a text size of 30 sdp. The comparative emulations 300 were executed using Eclipse ADT, an SDK made available by Android. Benefits of the present disclosure are particularly noteworthy when comparing the screen shot 301 of the Nexus 5 screen emulation with the screen shot 304 of the 10.1" WXGA tablet screen emulation. The scalable display units retain a size for the text object "sdp size unit" that is proportional to a ratio between the current screen dimensions (e.g., width) and a minimum screen dimension (e.g., width), according to one embodiment.

The comparative emulation 300 can be produced using the display unit converter 152 to generate multiple display unit conversion files 146, according to one embodiment. The code for the mobile application used to generate the comparative emulation 300 at least partially includes the following xml code:

```
<LinearLayout xmlns:android=a hypertext transfer protocol reference
    android:layout_width="matchparent"
    android:layout_height="matchparent"
    android:gravity="center"
    android:orientation="vertical">
<TextView
    android:layout_width="wrap_content"
    android:layout_height="wrap_content"
    android:text="px size unit"
    android:textSize="30px"/>
<TextView
    android:layout_width="wrap_content"
    android:layout_height="wrap_content"
    android:text="dp size unit"
    android:textSize="30dp"/>
<TextView
    android:layout_width="wrap_content"
    android:layout_height="wrap_content"
    android:text="sp size unit"
    android:textSize="30sp"/>
<TextView
    android:layout_width="wrap_content"
    android:layout_height="wrap_content"
    android:text="sdp size unit"
    android:textSize="@dimen/_30sdp"/>
</LinearLayout>.
```

In this example code, "android:textSize=@dimen/_30sdp" is a reference to the scalable display units that are converted from density-independent pixels, according to one embodiment.

Figure 4A:
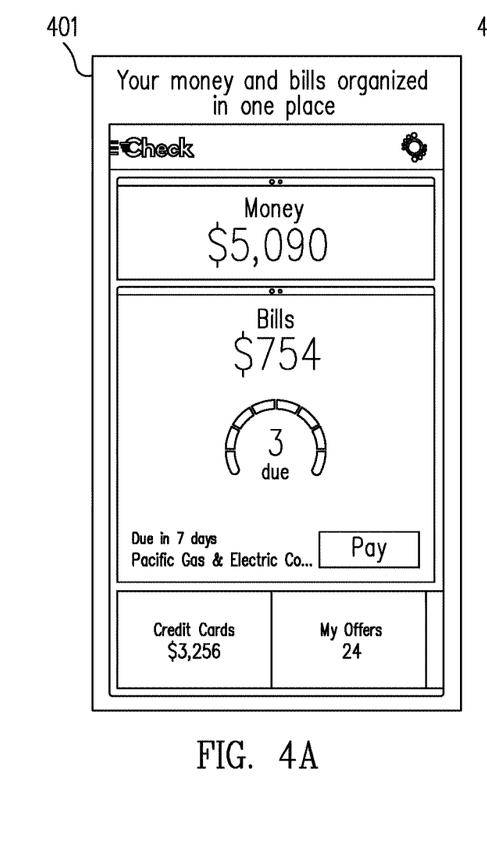
FIGS. 4A-4C are diagrams of a user interface used in an example of an implementation of a scalable application, in accordance with one embodiment.
Figure 4B:
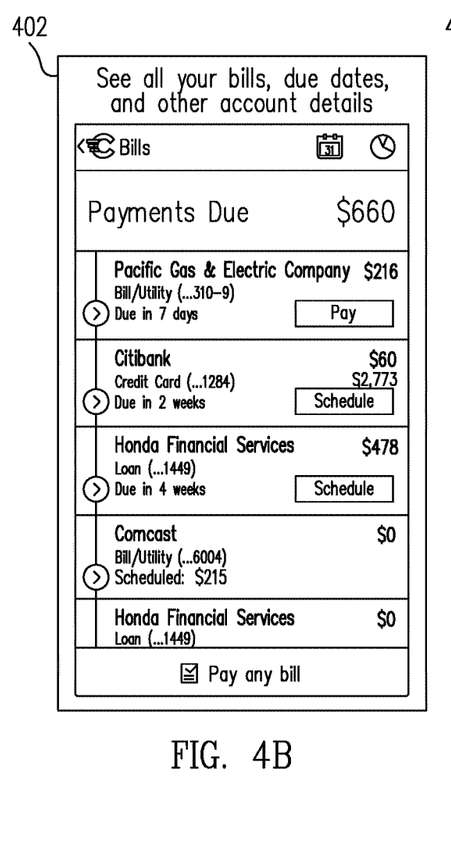
Figure 4C:
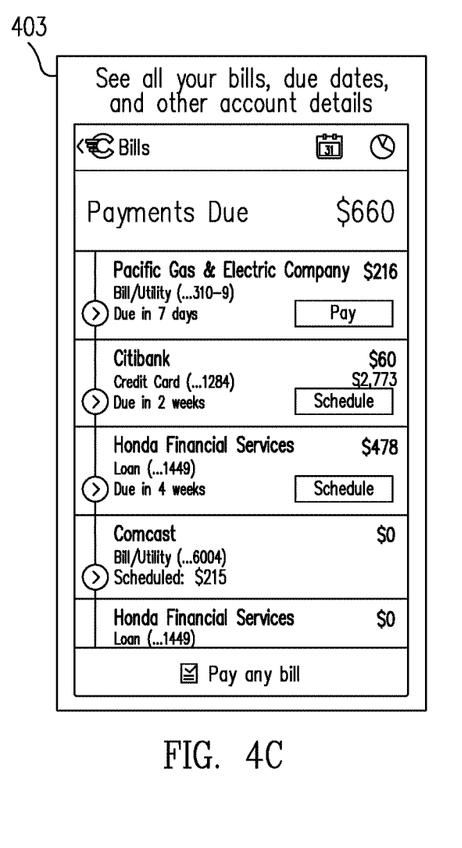

FIGS. 4A-4C illustrate example screenshots 401, 402, and 403, respectively, of an embodiment of the mobile application 147 which incorporates, references, and/or imports at least one display unit conversion file 146, to provide objects (e.g., text, diagrams, control features) that are scalable to various screen sizes using the scalable display units (sdp), according to one embodiment.

The screenshots 401, 402, and 403 show an embodiment of the mobile application 147 which may be a mobile application ("mobile app") that stays on top of a user's bills and money to reduce the likelihood of a user missing a bill receiving overdraft or late fees again, according to one embodiment. The embodiment of the mobile application 147 is configured to proactively staying on top of a user's bills and monitor the user's bank accounts and credit cards, all in one place, from a mobile electronic device, according to one embodiment. When bills are due or funds are low, the mobile application 147 is configured to automatically notify the user, according to one embodiment.

The mobile application 147 of the screenshots 401-403 is configured to provide, but not be limited to, one or more of the following services: provide reminders when bills are due and pay them on the spot or schedule bill payments in advance with 1 easy click; pay bills with a bank account or credit card; display and track all user's bills, accounts, and cash in one centralized place from a mobile electronic device; provide alerts when cash is low and credit limits are near; provide security with 128-bit encryption; provide remote data destruct to enable a user to delete all account information remotely with one easy click; and provide real-time alerts if any large purchases or unusual charges in an account are detected, according to various embodiments.

The production environment 100 addresses some of the difficulties associated with poorly sized objects in mobile electronic device user interfaces by generating a mobile application with a user interface that is scalable to mobile electronic devices with screens of various sizes, to enable a proportional display of objects between the various mobile devices, according to one embodiment. By generating a user interface that is scalable to mobile electronic devices with screens of various sizes, implementation of embodiments of the present disclosure allows for significant improvement to the field of MOBILE ELECTRONIC DEVICE USER INTERFACES, USER INTERFACES, USER EXPERIENCE, INFORMATION TECHNOLOGY, and OPERATING SYSTEMS. As one illustrative example, by generating a user interface that is scalable to mobile electronic devices with screens of various sizes, implementation of embodiments of the present disclosure increases system efficiency by using fewer processing cycles and less communications bandwidth because developers are now able to create a single version of a mobile application that renders text and objects equally well on mobile electronic devices of various sizes. As a result, embodiments of the present disclosure allow for improved processor performance, more efficient use of memory access and data storage capabilities, reduced communication channel bandwidth utilization, and faster communications connections. Consequently, computing and communication systems implementing and/or providing the embodiments of the present disclosure are transformed into faster and more operationally efficient devices and systems.

In addition, by generating a user interface that is scalable to mobile electronic devices with screens of various sizes, implementation of embodiments of the present disclosure represent a significant improvement to the field of providing an efficient user experience and, in particular, efficient use of human and non-human resources. As one illustrative example, by generating a user interface that is scalable to mobile electronic devices with screens of various sizes, users can devote less time and energy to adjusting the zoom level of the screens of their mobile devices to better view or manipulate the displayed content. Consequently, using embodiments of the present disclosure, the user experience is less burdensome and the user can dedicate more of his or her time to other activities or projects.

In accordance with one embodiment, a computing system implemented method generates a scalable application for mobile electronic devices. The method includes determining a number of screen dimensions for the mobile electronic devices, according to one embodiment. The method includes converting first display units into second display units for each of the number of screen dimensions, according to one embodiment. Converting the first display units into the second display units for each of the number of screen dimensions includes: determining a ratio between a selected one of the number of screen dimensions and a smallest one of the number of screen dimensions; iterating through an index of quantities of the second display units; and associating a quantity of first display units with an indexed quantity of the second display units, according to one embodiment. The quantity of the first display units is proportional to a product of the ratio and the indexed quantity of the second display units, according to one embodiment. Converting the first display units into the second display units also includes writing the index of quantities of the second display units with the quantity of first display units to display unit conversion files, according to one embodiment. Each display unit conversion file is associated with one of the number of screen dimensions, according to one embodiment. The method includes generating the scalable application based at least partially on the second display units, and generating the scalable application includes incorporating the display unit conversion files into the scalable application, according to one embodiment. The scalable application is configured to: determine an approximate screen dimension for each mobile electronic device that executes the scalable application; and apply the second display units to user interface objects to scale the user interface objects based at least partially on the approximate screen dimension, according to one embodiment. The second display units that are applied are associated with one of the number of screen dimensions that is similar to the approximate screen dimension, according to one embodiment.

In accordance with one embodiment, a computer-readable medium includes a plurality of computer-executable instructions for a mobile application which, when executed by a processor, cause the processor to display scalable user interface objects within the mobile application for mobile electronic devices, according to one embodiment. The instructions include a user interface configured to display user interface objects on screens of the mobile electronic devices, according to one embodiment. The user interface objects include one or more picture objects, diagram objects, text objects, and user interface control objects, according to one embodiment. The user interface enables the mobile application to display output from a user, and the user interface enables the mobile application to receive input from the user, according to one embodiment. The instructions include a display unit converter configured to scale dimensions of the user interface objects based at least partially on screen dimensions of the mobile electronic devices that execute the mobile application, according to one embodiment. The mobile application is configured to query a host mobile electronic device for the screen dimensions of the host mobile electronic device, according to one embodiment. The mobile application is configured to scale dimensions of the user interface objects based at least partially on a ratio between the screen dimensions of the host mobile electronic device and a reference screen dimension stored by the mobile application, according to one embodiment.

In accordance with one embodiment, a system generates a scalable application for mobile electronic devices. The system includes at least one processor; and at least one memory coupled to the at least one processor, the at least one memory having stored therein instructions which when executed by any set of the one or more processors, perform a process for generating a scalable application for mobile electronic devices, according to one embodiment. The process of the system includes determining a number of screen dimensions for the mobile electronic devices, according to one embodiment. The process includes converting first display units into second display units for each of the number of screen dimensions, according to one embodiment. Converting the first display units into the second display units for each of the number of screen dimensions includes determining a ratio between a selected one of the number of screen dimensions and a smallest one of the number of screen dimensions, according to one embodiment. Converting the first display units into the second display units includes iterating through an index of quantities of the second display units; and associating a quantity of first display units with an indexed quantity of the second display units, according to one embodiment. The quantity of the first display units is proportional to a product of the ratio and the indexed quantity of the second display units, according to one embodiment. Converting the first display units into the second display units includes writing the index of quantities of the second display units with the quantity of first display units to display unit conversion files, according to one embodiment. Each display unit conversion file is associated with one of the number of screen dimensions, according to one embodiment. The process further includes generating the scalable application based at least partially on the second display units, and generating the scalable application includes incorporating the display unit conversion files into the scalable application, according to one embodiment. The scalable application is configured to: determine an approximate screen dimension for each mobile electronic device that executes the scalable application; and apply the second display units to user interface objects to scale the user interface objects based at least partially on the approximate screen dimension, according to one embodiment. The second display units that are applied are associated with one of the number of screen dimensions that is similar to the approximate screen dimension, according to one embodiment.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for generating a scalable application for mobile electronic devices, the method comprising:
   determining, prior to generating a scalable application, a plurality of predetermined screen dimensions for prospective mobile electronic devices the scalable application is designed to accommodate;
   converting, prior to generating a scalable application, first display units into second display units for each of the plurality of predetermined screen dimensions,
      wherein converting the first display units into the second display units for each of the plurality of predetermined screen dimensions includes:
         determining, prior to generating a scalable application, a ratio between a selected one of the number of screen dimensions and a smallest one of the plurality of predetermined screen dimensions;
         iterating, prior to generating a scalable application, through an index of quantities of the second display units;
         associating, prior to generating a scalable application, a quantity of first display units with an indexed quantity of the second display units,
            wherein the quantity of the first display units is proportional to a product of the ratio and the indexed quantity of the second display units; and
         writing, prior to generating a scalable application, the index of quantities of the second display units with the quantity of first display units to display unit conversion files,
            wherein each display unit conversion file is associated with one of the plurality of predetermined screen dimensions; and
   generating the scalable application based on the second display units,
      wherein generating the scalable application includes incorporating the display unit conversion files into the scalable application,
      wherein the scalable application is configured to convert the scalable display into a device-specific display by:
         determine an approximate screen dimension for mobile electronic devices that execute the scalable application; and
         apply the second display units to user interface objects to scale the user interface objects based at least partially on the determined approximate screen dimension,
            wherein the second display units that are applied are associated with one of the number of screen dimensions that is similar to the approximate screen dimension.

2. The method of claim 1, wherein the first display units are density-independent pixels (dp) and the second display units are scalable-density-independent pixels (sdp).

3. The method of claim 2, wherein the density-independent pixels are inversely proportional to a screen density of the mobile electronic devices.

4. The method of claim 3, wherein measured units of the screen density are dots per inch.

5. The method of claim 1, wherein the first display units are pixels (px) and the second display units are scalable-density-independent pixels (sdp).

6. The method of claim 1, wherein the plurality of predetermined screen dimensions includes screen widths.

7. The method of claim 6, wherein the screen widths are in units of density-independent pixels (dp).

8. The method of claim 7, wherein the screen widths include 300 dp, 360 dp, 420 dp, 480 dp, 540 dp, 600 dp, 660 dp, and 720 dp.

9. The method of claim 1, wherein incorporating the display unit conversion files includes importing information from the display unit files into the scalable application while the scalable application is being compiled.

10. The method of claim 1, wherein the user interface objects include one or more picture objects, diagram objects, text objects, and user interface control objects.

11. The method of claim 1, wherein the predetermined screen dimensions are generalized into categories of small, medium, large, and extra-large mobile electronic device screens.

12. The method of claim 1, further including:
   transmitting the scalable application to a distribution computing environment to enable the distribution computing environment to distribute the scalable application to the mobile electronic devices through one or more networks.

13. A system for generating a scalable application for mobile electronic devices, comprising:
   one or more processors; and
   at least one memory coupled to the at least one processor, the at least one memory having stored therein instructions which when executed by any set of the one or more processors, perform a process for generating a scalable application for mobile electronic devices, the process including:

determining, prior to generating a scalable application, a plurality of predetermined screen dimensions for prospective mobile electronic devices the scalable application is designed to accommodate;

converting, prior to generating a scalable application, first display units into second display units for each of the plurality of predetermined screen dimensions,
  wherein converting the first display units into the second display units for each of the plurality of predetermined screen dimensions includes:
    determining, prior to generating a scalable application, a ratio between a selected one of the plurality of predetermined screen dimensions and a smallest one of the plurality of predetermined screen dimensions;
    iterating, prior to generating a scalable application, through an index of quantities of the second display units;
    associating, prior to generating a scalable application, a quantity of first display units with an indexed quantity of the second display units,
      wherein the quantity of the first display units is proportional to a product of the ratio and the indexed quantity of the second display units; and
    writing, prior to generating a scalable application, the index of quantities of the second display units with the quantity of first display units to display unit conversion files,
      wherein each display unit conversion file is associated with one of the plurality of predetermined screen dimensions; and
generating the scalable application based on the second display units,
  wherein generating the scalable application includes incorporating the display unit conversion files into the scalable application,
  wherein the scalable application is configured to convert the scalable display into a device-specific display by:
    determine an approximate screen dimension for mobile electronic devices that execute the scalable application; and
    apply the second display units to user interface objects to scale the user interface objects based at least partially on the determined approximate screen dimension,
      wherein the second display units that are applied are associated with one of the number of screen dimensions that is similar to the approximate screen dimension.

14. The system of claim 13, wherein the first display units are density-independent pixels (dp) and the second display units are scalable-density-independent pixels (sdp).

15. The system of claim 14, wherein the density-independent pixels are inversely proportional to a screen density of the mobile electronic devices.

16. The system of claim 15, wherein measured units of the screen density are dots per inch.

17. The system of claim 13, wherein the first display units are pixels (px) and the second display units are scalable-density-independent pixels (sdp).

18. The system of claim 13, wherein the plurality of predetermined screen dimensions include screen widths.

19. The system of claim 18, wherein the screen widths are in units of density-independent pixels (dp).

20. The system of claim 19, wherein the screen widths include 300 dp, 360 dp, 420 dp, 480 dp, 540 dp, 600 dp, 660 dp, and 720 dp.

21. The system of claim 13, wherein incorporating the display unit conversion files includes importing information from the display unit files into the scalable application while the scalable application is being written and compiled.

22. The system of claim 13, wherein the user interface objects include one or more picture objects, diagram objects, text objects, and user interface control objects.

23. The system of claim 13, wherein the screen dimensions are generalized into categories of small, medium, large, and extra-large mobile electronic device screens.

* * * * *